(12) United States Patent
Neaves

(10) Patent No.: US 9,650,048 B2
(45) Date of Patent: May 16, 2017

(54) VEHICLE CONTROLLER AND METHOD

(71) Applicant: JAGUAR LAND ROVER LIMITED, Warwickshire (GB)

(72) Inventor: Ben Neaves, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days.

(21) Appl. No.: 14/917,806

(22) PCT Filed: Sep. 9, 2014

(86) PCT No.: PCT/EP2014/069180
§ 371 (c)(1),
(2) Date: Mar. 9, 2016

(87) PCT Pub. No.: WO2015/036396
PCT Pub. Date: Mar. 19, 2015

(65) Prior Publication Data
US 2016/0214611 A1    Jul. 28, 2016

(30) Foreign Application Priority Data

Sep. 11, 2013  (GB) .................................. 1316183.1

(51) Int. Cl.
*G06F 17/00*    (2006.01)
*B60W 30/18*    (2012.01)
(Continued)

(52) U.S. Cl.
CPC ....... *B60W 30/18072* (2013.01); *F02D 29/02* (2013.01); *B60W 30/143* (2013.01);
(Continued)

(58) Field of Classification Search
None
See application file for complete search history.

(56) References Cited

U.S. PATENT DOCUMENTS 6,095,945 A * 8/2000 Graf ..................... B60K 28/165
477/110
6,926,638 B1  8/2005 Gimmler et al.
(Continued)

FOREIGN PATENT DOCUMENTS

DE   102004017115 A1  10/2005
DE   102006046218 A1   4/2008
(Continued)

OTHER PUBLICATIONS

International Search Report and Written Opinion of the International Searching Authority for International application No. PCT/EP2014/069180 dated Nov. 24, 2014.
(Continued)

*Primary Examiner* — Dirk Wright
(74) *Attorney, Agent, or Firm* — Carlson, Gaskey & Olds

(57) ABSTRACT

The present invention relates to a vehicle controller (1) for activating a vehicle glide mode. The controller (1) receives vehicle operating data including torque request data representative of a torque request; acceleration data representative of vehicle acceleration; and output torque data representative of an output torque. The controller (1) is configured to analyze the vehicle operating data to identify a vehicle glide opportunity. The controller (1) is operative to generate an activation signal (4) for activating the vehicle glide mode when said vehicle glide opportunity has been identified and the torque request is positive. The controller is thereby operative to implement a vehicle glide strategy. The controller (1) can also operate to deactivate the vehicle glide mode. The present invention also relates to a method of activating a vehicle glide mode.

22 Claims, 8 Drawing Sheets

(51) Int. Cl.
  *F02D 29/02* (2006.01)
  *B60W 30/14* (2006.01)
(52) U.S. Cl.
  CPC ............ *B60W 2030/1809* (2013.01); *B60W 2510/0604* (2013.01); *B60W 2510/0623* (2013.01); *B60W 2510/0638* (2013.01); *B60W 2510/0657* (2013.01); *B60W 2510/104* (2013.01); *B60W 2510/1005* (2013.01); *B60W 2520/10* (2013.01); *B60W 2520/105* (2013.01); *B60W 2540/10* (2013.01); *B60W 2540/18* (2013.01); *B60W 2710/0644* (2013.01); *B60W 2710/0666* (2013.01); *B60W 2720/103* (2013.01); *B60W 2720/106* (2013.01)

(56) References Cited

U.S. PATENT DOCUMENTS

| | | | | | |
|---|---|---|---|---|---|
| 7,455,619 | B2* | 11/2008 | Jiang | ............ | B60W 10/02 477/176 |
| 8,187,149 | B2* | 5/2012 | Koenig | ............ | B60W 10/115 477/115 |
| 8,321,102 | B2* | 11/2012 | Wurthner | ............ | B60W 10/02 701/54 |
| 8,612,108 | B2* | 12/2013 | Polimeno | ............ | B60W 10/02 477/179 |
| 8,706,379 | B2* | 4/2014 | Jang | ............ | B60T 1/10 180/65.21 |
| 9,005,075 | B2* | 4/2015 | Reed | ............ | B60W 10/02 477/3 |
| 9,562,480 | B2* | 2/2017 | Hirano | ............ | F02D 17/00 |
| 2011/0136620 | A1 | 6/2011 | Gibson et al. | | |
| 2013/0211686 | A1 | 8/2013 | Shono et al. | | |
| 2013/0226420 | A1 | 8/2013 | Pedlar et al. | | |
| 2015/0362065 | A1* | 12/2015 | Johansson | ............ | B60W 30/18072 701/65 |

FOREIGN PATENT DOCUMENTS

| | | |
|---|---|---|
| EP | 2604461 A1 | 6/2013 |
| WO | 02/092378 | 11/2002 |
| WO | 2012/172840 A1 | 12/2012 |

OTHER PUBLICATIONS

Combined Search and Examination Report under Sections 17 and 18(3) for Application No. GB1316183.1 dated Mar. 27, 2014.

\* cited by examiner

VEHICLE CONTROLLER AND METHOD

TECHNICAL FIELD

The present invention relates to a vehicle controller for activating a vehicle glide mode. The present invention also relates to an engine control module; to a vehicle system; to a vehicle; to a method; and to a computer program product.

BACKGROUND OF THE INVENTION

It is known to provide a vehicle with a coasting function which allows the vehicle to reduce driveline losses during a vehicle overrun condition. These strategies are referred to herein as overrun idle coasting, since they are implemented when the driver completely releases the throttle pedal. An overrun idle coasting control system is currently available from Porsche® automobiles. When the accelerator pedal is released, the transmission can be selectively decoupled from the driveline allowing the vehicle to coast without engine braking. While the transmission is decoupled from the driveline, the engine speed can be reduced to an engine idle speed in order to reduce fuel consumption. The appropriate drive gear is engaged to couple the transmission to the driveline when the throttle (accelerator) or brake pedal is depressed. The coasting function can, for example, be utilized on downhill gradients that allow the vehicle to maintain a constant speed.

Under favourable travelling conditions (typically when the vehicle travels on a gently sloping gradient), these overrun idle coasting control systems allow the vehicle to maintain motion without perceptible deceleration. Accordingly, fuel consumption can be reduced. However, coasting control systems in accordance with the prior art may be at conflict with other vehicle systems such as engine-mounted regenerative battery charging systems, which try to capture and utilise energy during the same favourable travelling conditions.

Overrun idle coasting control systems according to the prior art are activated when the driver releases the throttle pedal. However, as the coasting function is not always engaged when the throttle pedal is released, the vehicle deceleration behaviour may vary depending on whether the coasting function is activated. The driver may thus experience unexpected or inconsistent responses from the vehicle, which may negatively affect driver confidence.

U.S. Pat. No. 5,794,170 B discloses a downhill coasting situation detecting device for an automotive vehicle comprising a sensor for detecting an opening degree of a throttle valve; a first derivative calculating device for calculating a first derivative of the vehicle speed; a second derivative calculating device for calculating a second derivative of the vehicle speed and a downhill coasting situation determining device for determining that the automotive vehicle has begun downhill coasting in which the throttle valve opening is zero; the first derivative is positive; and the second derivative is nearly equal to zero. Accordingly, transmission gear down-shifting for obtaining further engine braking can be automatically executed in the downhill coasting situation.

US 2010/0185368 A1 discloses a method and device for controlling a coasting movement of a vehicle such that the vehicle can coast or stop in a smooth manner.

At least in certain embodiments the present invention seeks to overcome or ameliorate at least some of the limitations associated with the prior art arrangements.

SUMMARY OF THE INVENTION

Aspects of the present invention relate to a vehicle controller for activating a vehicle glide mode; to an engine control module; to a vehicle system; to a vehicle; to a method; and to a computer program product.

According to an aspect of the present invention there is provided a vehicle controller for activating a vehicle glide mode, the controller being configured to receive vehicle operating data, said vehicle operating data comprising:
  torque request data representative of a torque request;
  acceleration data representative of vehicle acceleration; and
  output torque data representative of an output torque;
  wherein the controller is configured to analyse said vehicle operating data to identify a vehicle glide opportunity; the controller being configured to generate an activation signal for activating the vehicle glide mode when said vehicle glide opportunity has been identified and the torque request is positive. The vehicle controller can thereby engage the vehicle glide mode during an on-load scenario when the torque request is greater than zero. This typically corresponds to the scenario where the driver is partially depressing the throttle pedal, for example when the driver's foot is engaging the throttle pedal in a partially depressed condition (i.e. partway between a released position and a fully depressed position). Thus, the operation of the vehicle controller differs from the prior art arrangements which engage a coasting mode when the throttle pedal is completely released. To emphasis the difference between these operating conditions, the term 'gliding' is used herein to describe the present invention.

The vehicle glide opportunity can correspond to a scenario when the perceived vehicle behaviour (i.e. the vehicle response perceived by the driver) will be substantially unchanged when the glide mode is activated. The controller can be configured to identify operating conditions when any change in the vehicle dynamics (for example vehicle speed and/or acceleration) associated with activation of the vehicle glide mode will be at least substantially imperceptible. At least in certain embodiments, the vehicle control system can offer potential improvements in the operating efficiency of the vehicle irrespective of the driving style adopted by a driver.

The controller according to aspects of the present invention has particular applications in a vehicle comprising an internal combustion engine. When the vehicle glide mode is activated, the operating speed of the engine can be reduced, for example to an engine idle speed. It will be appreciated, however, that the controller is also applicable to a vehicle comprising an electric traction motor, for example an electric vehicle or a hybrid electric vehicle.

In use, at least a portion of a driveline of the vehicle can be disconnected when the vehicle glide mode is activated. In use, the activation signal can control operation of a coupling mechanism, such as a clutch, to decouple a section of the vehicle powertrain. The clutch can be disposed in a vehicle transmission, for example. In dependence on the activation signal, a transmission control module can operate to decouple at least part of the vehicle driveline. At least in certain embodiments, the controller may reduce fuel or energy consumption by activating the vehicle glide mode. The vehicle glide opportunity can correspond to a scenario when the perceived vehicle behaviour will be unchanged when said vehicle driveline is decoupled (partially or completely, depending on the system).

The vehicle operating data includes output torque data. The output torque data can be representative of an output torque generated by a vehicle drive means, such as an internal combustion engine or an electric traction motor. The controller can be configured to compare the output torque to a reference torque. The reference torque can be representative of the output torque required to achieve a defined vehicle dynamic state under reference conditions, for example to maintain substantially constant vehicle speed on a substantially horizontal road (i.e. steady-state operation). The controller can be configured to identify a vehicle glide opportunity when the reference torque for steady-state operation of the vehicle is greater than the output torque. A different reference torque could be used, for example to achieve a pre-defined vehicle acceleration (positive or negative) on a horizontal road.

The reference torque can be related to the vehicle speed. The controller can, for example, be configured to access a reference torque curve (or a look-up table) to determine the appropriate reference torque in view of the current vehicle speed. The controller can determine a relationship between the vehicle current road load and the vehicle acceleration. For a given output torque, the vehicle should be able to maintain speed and the reference torque curve is defined at or just below this level. If the vehicle is able to maintain a constant speed or accelerate whilst the powertrain is outputting a torque equal to or below this curve, then it can be assumed the vehicle has external assistance or has a very low road load. The assumption is that gravity and road gradient are assisting the vehicle. The torque reference curve can be tuned at high and low vehicle speeds to improve refinement, for example to provide improved engagement/disengagement of the vehicle glide mode.

The vehicle operating data includes acceleration data. The controller can be configured to identify said vehicle glide opportunity when the vehicle acceleration substantially matches a defined acceleration curve; or the vehicle acceleration is between upper and lower acceleration thresholds defined with reference to a defined acceleration curve. The vehicle glide opportunity can be identified when the vehicle acceleration is within an acceleration range defined by said upper and lower acceleration thresholds. The defined acceleration curve can be mapped to the vehicle speed. For example, the defined acceleration curve can be selected from a look-up table based on the measured vehicle speed. Alternatively, an algorithm can be used to define the acceleration curve based on the vehicle speed. The controller can be configured to identify said vehicle glide opportunity when the vehicle acceleration is positive or substantially uniform.

To reduce or minimise any perceived changes in the vehicle behaviour, the upper and lower acceleration thresholds can be defined to represent typical driver perception thresholds (i.e. changes in acceleration which will be at the limits of those perceptible to a typical driver). By using these thresholds to identify vehicle gliding opportunities, any perceptible change in the vehicle response can be reduced when the vehicle glide mode is activated. Thus, the consistency of the vehicle response can, at least in certain embodiments, be improved over prior art idle coasting systems.

The vehicle acceleration curve can be gently sloping (for example acceleration less than ±0.25 m/s$^2$, ±0.5 m/s$^2$ or ±1 m/s$^2$), typically in a negative sense (i.e. vehicle deceleration). When the output torque is lower than the reference output torque, the vehicle acceleration (positive or negative) is examined to estimate the effective vehicle road load. The output torque can thereby be used by the controller as an entry condition. If the vehicle acceleration is zero or relatively gentle and there is a positive torque request (for example, due to the driver depressing the throttle pedal a small distance), the controller determines that the driver is satisfied with the current vehicle progress. This is indicative of a scenario in which the vehicle gliding mode could be activated (i.e. a vehicle glide opportunity). If the measured vehicle acceleration is too high for a given output torque, the controller can determine that the road gradient is too high and inhibits the vehicle glide mode. If the controller determines that the acceleration is above a positive threshold, this can indicate that the vehicle is travelling down a hill which is excessively steep. Conversely, if the controller determines that the acceleration is above a negative threshold, this can indicate that the vehicle is travelling up a hill.

In one embodiment, the controller can be configured to identify a vehicle glide opportunity when the output torque is less than the reference torque; and the vehicle acceleration is between upper and lower defined acceleration thresholds. The upper and lower acceleration thresholds can optionally be related to the output torque, for example based on a vehicle acceleration curve defined for a given output torque. Alternatively, or in addition, the upper and lower acceleration thresholds can be related to vehicle speed.

At least in certain embodiments, the controller can also check the rate of change of the torque request. A vehicle gliding opportunity can be identified when the rate of change of the torque request is substantially zero (i.e. substantially uniform torque request); and/or is within a predefined tolerance range, typically representing relatively gentle changes in the torque request. This is indicative of a scenario in which the driver is not trying to increase vehicle acceleration or compensate for increasing gradient and, accordingly, that the driver feels the vehicle is at or potentially above its desired speed.

The torque request can be a driver-generated torque request. The torque request can be made directly or indirectly. When requested directly, the driver torque request can be made by operating the vehicle throttle pedal. The driver torque request increases in dependence on actuation on the throttle pedal. The pedal travel position corresponding to a zero torque request is referred to herein as the neutral pedal position and can vary for different vehicles. For example, the neutral pedal position can correspond to a position when the pedal is released. Alternatively, the neutral pedal position can correspond to a pedal position when the pedal is partially depressed (and releasing the pedal corresponds to a negative torque request). Due to this variability, the vehicle controller is described herein with reference to the torque request, rather than pedal position.

The torque request can be made via a cruise control module or an adaptive cruise control module. The controller can be configured to control activation/deactivation of the vehicle glide mode to match a target vehicle speed determined by the cruise control module. The cruise control module can generate positive torque requests to maintain or match the target vehicle speed. The target vehicle speed can be used to control activation and/or deactivation of the vehicle glide mode. A comparison between the current vehicle speed and the target vehicle speed can be performed to determine when to activate and/or to deactivate the vehicle glide mode. The target vehicle speed can be specified by the driver or can be set by the cruise control module, for example when operating in an adaptive cruise control mode.

The vehicle operating data comprises torque data representative of an output torque. The output torque can correspond to the output torque delivered at the transmission output. Alternatively, the output torque can correspond to an input or output torque at the vehicle transfer box or vehicle differential. The output torque can correspond to the torque delivered at the vehicle wheels. The output torque can be measured or modelled.

The operating data can comprise data representing vehicle dynamics, for example comprising one or more of the following: vehicle speed, vehicle acceleration (longitudinal and/or lateral), and vehicle rotation (about the X, Y or Z axis, individually or in combination). The operating data can comprise vehicle operational data, such as engine speed, output torque, transmission range (selected gear), vehicle operating mode (such as Dynamic, Sport or Road) and so on.

The vehicle operating data can comprise one or more of the following data types: vehicle speed data representative of a vehicle speed; vehicle acceleration data representative of a vehicle acceleration (longitudinal and/or lateral); vehicle steering angle data representative of a vehicle steering angle; vehicle gear position data representative of a vehicle gear position; engine speed data representative of a vehicle engine speed; and transmission output speed data representative of a transmission output speed. The controller can be configured to receive any of the listed data from a single electronic control unit (ECU), from multiple ECUs, or directly from one or more appropriate data acquisition means, for example one or more vehicle sensors.

At least in certain embodiments, the controller can be configured to identify a vehicle glide opportunity when a change in the vehicle speed differs from an expected vehicle speed change for a given output torque. The controller can be configured to monitor vehicle acceleration in dependence on the output torque. The vehicle acceleration for a given output torque can, for example, be compared to a reference vehicle acceleration curve for that output torque. The controller can be configured to activate the vehicle glide mode when the vehicle acceleration is within a gliding range defined on said vehicle acceleration curve. The gliding range can be predefined or can be calculated dynamically. The reference vehicle acceleration can be mapped against vehicle output torque, for example to define different gliding ranges for a range of output torques.

The vehicle acceleration range can be defined to reduce or minimise unexpected vehicle responses when the vehicle glide mode is activated. The driver perception of a change in vehicle response can be reduced or minimised by appropriate definition of the vehicle acceleration range. The vehicle acceleration range can optionally be modified in different vehicle operating modes to alter the range of dynamic conditions which will initiate activation of the vehicle glide mode.

Alternatively, or in addition, the vehicle operating data can comprise a reference torque representative of the output torque required to maintain a substantially constant vehicle speed (i.e. substantially steady-state operation of the vehicle), typically on a horizontal (level) surface. If the vehicle acceleration is within a defined range (typically defined with reference to an acceleration curve) when the output torque is less than the reference torque, the controller can be configured to identify said vehicle glide opportunity. The vehicle acceleration can be positive (i.e. the vehicle speed is increasing) and/or zero (i.e. the vehicle speed is constant). A further vehicle glide opportunity can be identified if the vehicle acceleration is negative (i.e. the vehicle speed is decreasing) but is less than would be expected for the current output torque. This combination of parameters can provide an indication that the vehicle is travelling on a surface having a negative gradient (i.e. the vehicle is travelling downhill). The reference torque can be adjusted for a particular vehicle type or configuration (such as a particular vehicle model) for example having a standard loading. The reference torque can be predefined (for example based on empirical data), or it can be calculated dynamically.

At least in certain embodiments, the vehicle operating data comprise road data representative of road condition. The controller can therefore identify vehicle glide opportunities based on information relating to road conditions, such as road gradient, slope etc. The controller can be configured to identify a vehicle glide opportunity when the road gradient is negative in the direction of travel of the vehicle (i.e. the vehicle is travelling downhill). A negative road gradient translates into a reduction in the output torque required to maintain vehicle speed. A negative road gradient can therefore determine vehicle conditions suitable for activation of the vehicle glide mode.

In some embodiments, the vehicle operating data can comprise fuel flow data representative of vehicle fuel consumption, such as instantaneous fuel consumption or average fuel consumption. The controller can be configured to inhibit output of the activation signal if the vehicle fuel consumption is less than a reference vehicle fuel consumption, for example an idle engine vehicle fuel consumption (i.e. an expected vehicle fuel consumption for an idling engine).

The controller can be configured to determine one or more of the following parameters based on the operating data: a torque request curve; a transmission output torque; and vehicle acceleration. The controller can be configured to identify vehicle glide opportunities when one or more of the following conditions are satisfied: the torque request curve is within a reference torque request range; the output torque is less than a reference output torque; the vehicle acceleration is within a reference vehicle acceleration range. The acceleration range can be defined in relation to an acceleration curve.

At least in certain embodiments, the controller can be configured to activate the vehicle glide mode when one or more of the following conditions are satisfied: the vehicle acceleration is within a vehicle acceleration range; the vehicle speed is greater than a reference vehicle speed; and the gear position is greater than a reference gear position.

The controller can be configured to generate a deactivation signal for deactivating the vehicle glide mode when one or more of the following reset conditions are satisfied: the torque request is greater than a reference torque request curve or an output torque threshold; and the vehicle acceleration is greater than a reference vehicle acceleration. The reference torque request range and/or the reference vehicle acceleration range can be predefined or calculated dynamically.

The controller can be configured to generate a deactivation signal for deactivating the vehicle glide mode, wherein once said activation signal has been generated the controller is configured to maintain activation of said glide mode until said deactivation signal is generated. The deactivation signal can be generated when one or more of the conditions described herein are not satisfied.

The controller can be configured to identify a vehicle glide opportunity when the torque request is greater than zero and is either constant or is within a torque request range delimited by upper and lower torque request thresholds. The torque request range and/or thresholds can be predefined or can be calculated dynamically. A mean value of the torque request range can be decreasing with respect to time.

In some embodiments, the vehicle operating data can comprise throttle pedal data representative of a deflection of a throttle pedal. A correlation is defined between the throttle pedal position and the torque request. The controller can be configured to identify a vehicle glide opportunity when the deflection of the throttle pedal is past the neutral pedal position, is constant or decreasing at a predefined rate, or is within a throttle pedal deflection range delimited by lower and upper throttle pedal deflection thresholds. The controller can be configured to generate the deactivation signal for deactivating the vehicle glide mode when the deflection of the throttle pedal is below the lower throttle pedal deflection threshold or above the upper throttle pedal deflection threshold, or when the throttle pedal is at the neutral pedal position.

In those arrangements in which the driveline is decoupled within the transmission, the controller can be configured to send said activation signal for activating the vehicle glide mode to a transmission control module. In dependence on the activation signal, the transmission controller can control the transmission to decouple at least a portion of the driveline. Conversely, the controller can be configured to send said deactivation signal for deactivating the vehicle glide mode to the transmission control module. In dependence on the deactivation signal, the transmission controller can control the transmission to re-couple the driveline. The signals can be transmitted to the transmission control module over a communications network, such as a CAN bus.

The controller can be configured to receive said torque request data from a vehicle cruise control module. The cruise control module can generate the torque request data to achieve or maintain a target vehicle speed. The target vehicle speed can be defined by the driver. Alternatively, or in addition, the cruise control module can determine the target vehicle speed, for example based on the relative positioning and/or movements of other vehicles.

The controller can be configured to determine a target engine speed for re-coupling the vehicle driveline when the vehicle gliding mode is deactivated, for example a target engine speed for matching the rotational speed of the driveline when the coupling is engaged. The controller can be configured to generate an engine speed control signal representative of the target engine speed. The controller can also be configured to send said engine speed control signal to an engine control module. When the vehicle glide mode is deactivated, the controller can be configured to implement an engine control strategy to increase the engine speed (for example from the engine idle speed) to the required engine speed, for example to match the torque request.

According to a further aspect of the present invention there is provided an engine control module comprising a controller as described herein.

According to a further aspect of the present invention, there is provided a vehicle system comprising an engine control module as described herein, or a controller as described herein.

According to a further aspect of the present invention there is provided a vehicle comprising a vehicle system as described herein.

According to a further aspect of the present invention there is provided a method of activating a vehicle glide mode, the method comprising:
  receiving vehicle operating data comprising:
    torque request data representative of a torque request;
    acceleration data representative of vehicle acceleration; and
    output torque data representative of an output torque;
  analysing said vehicle operating data to identify a vehicle glide opportunity; and
  generating an activation signal for activating the vehicle glide mode when said vehicle glide opportunity has been identified and the torque request is greater than zero. The activation signal is thereby only generated when there is a positive torque request.

According to a yet further aspect of the present invention there is provided a vehicle controller for activating a vehicle glide mode, the controller being configured to receive vehicle operating data, said vehicle operating data comprising:
  acceleration data representative of vehicle acceleration; and
  output torque data representative of an output torque;
  wherein the controller is configured to output a vehicle glide mode activation signal when the output torque is less than a reference torque and the vehicle acceleration is between an upper acceleration threshold and a lower acceleration threshold.

The reference torque can be representative of the output torque required to maintain a substantially constant vehicle speed on a horizontal surface. The reference torque can be based on a measured vehicle operating speed. For example, the reference torque can be read from a look-up table. The output torque can thereby be compared to a reference torque defined for the current vehicle speed.

The upper acceleration threshold and the lower acceleration threshold can be based on a defined acceleration curve. The defined acceleration curve can be based on vehicle speed. The controller can be configured to identify said vehicle glide opportunity when the torque request is substantially uniform and/or within defined torque request tolerances.

The vehicle operating data further can comprise torque request data representative of a torque request. The controller can be configured to output the vehicle glide mode activation signal when the torque request is positive.

According to a yet further aspect of the present invention there is provided a method of activating a vehicle glide mode, the method comprising:
  receiving acceleration data representative of vehicle acceleration; and
  output torque data representative of an output torque; and
  generating a vehicle glide mode activation signal when the output torque is less than a reference torque and the vehicle acceleration is between an upper acceleration threshold and a lower acceleration threshold.

According to a further aspect of the present invention there is provided a computer program product for configuring or reconfiguring a vehicle system having a controller, the computer program product comprising a computer readable storage medium including computer readable program code, wherein the computer readable program code, when executed on the vehicle system, configures or reconfigures the vehicle system for performing a method as described herein.

The acquired data and/or operating parameters described herein are analysed by the controller to identify opportunities suitable for activating the vehicle glide mode. After the vehicle glide mode has been activated, the controller can operate to identify conditions to trigger deactivation of the vehicle glide mode. It will be understood that both the activation and deactivation of the vehicle glide mode can be based on vehicle dynamic conditions which are subject to change over time. The acquired data and/or operating parameters can be sampled or calculated according to appropriate sampling rates, and the processor can be configured to refresh acquisition, analysis and/or measurements at appropriate rates.

Furthermore, any reference data or parameter, in the form of individual values or ranges, can also be time-dependent. The controller can thus be configured to identify time variable windows of opportunities for activation and/or deactivation of the vehicle glide mode, each window being defined according to one or more conditions.

The lists of acquired data and/or operating parameters provided above are not exhaustive. It will be understood that different data may be acquired (for example, by direct measurement), and/or different parameters may be calculated, compared to those listed herein. The controller can be configured to prioritise particular parameters for activation/deactivation of the vehicle glide mode in dependence on certain vehicle dynamic conditions.

The vehicle described herein is a wheeled vehicle, for example an automobile. The references herein to the vehicle gliding are to the continuous motion of the vehicle, typically in a smooth and progressive manner. At least a portion of the vehicle driveline is typically disconnected such that a motive force is no longer applied at the wheels.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A vehicle controller 1 according to an embodiment of the present invention will now be described with reference to the accompanying Figures. The vehicle controller 1 is configured selectively to activate and deactivate a vehicle glide mode, as described herein.

Figure 1:
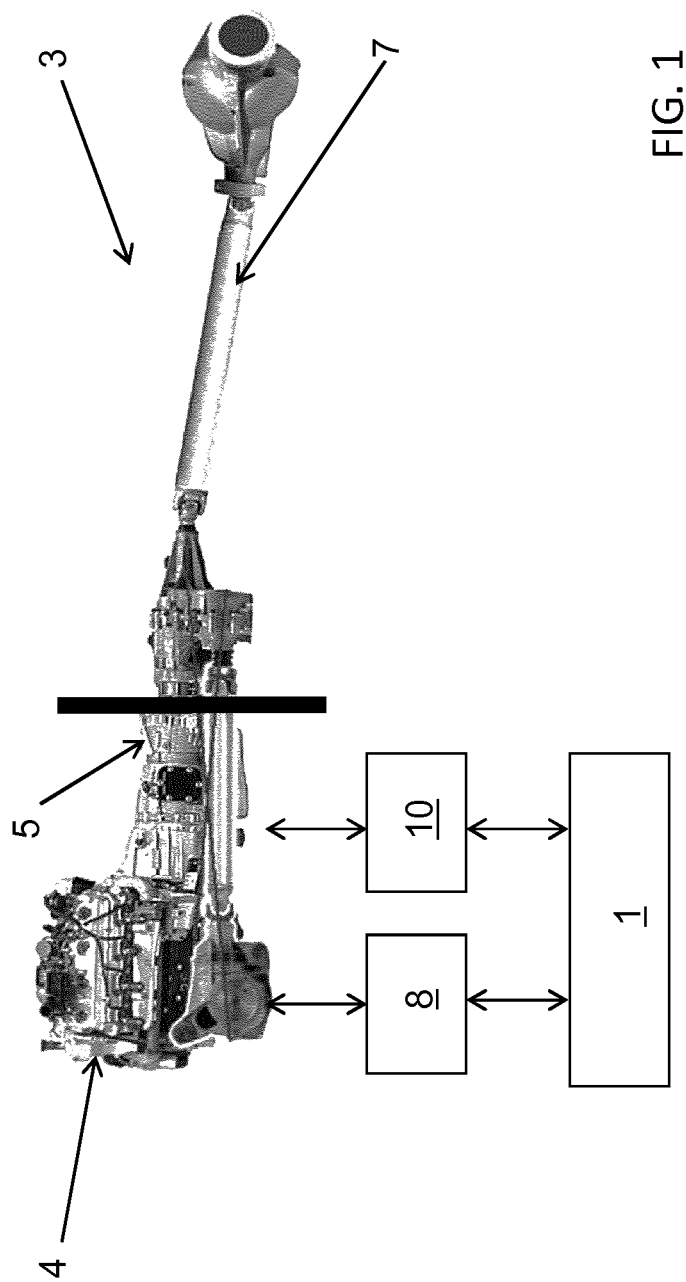
FIG. 1 illustrates schematically the concept of powertrain disconnection in accordance with an embodiment of the present invention.

The controller 1 is disposed in a vehicle 2 having a powertrain 3. The powertrain 3 comprises an internal combustion engine 4, a transmission 5 and a driveline 7, as illustrated in FIG. 1. The driveline 7 is arranged to transmit power to one or more wheels W. The powertrain 3 could optionally also include an electric drive machine (not shown) for supplying a traction force to said one or more wheels. In the present embodiment, the vehicle 2 is an automobile but it will be appreciated that the controller 1 could be implemented in other wheeled vehicles.

The controller 1 monitors one or more vehicle dynamic conditions, such as vehicle acceleration and/or speed; and one or more vehicle operating parameters, such as output torque. The controller 1 is configured to identify a vehicle glide opportunity when the measured dynamic condition(s) differs from an expected vehicle dynamic condition for the current vehicle operating parameter(s). The controller 1 performs a further check to identify a positive torque request indicative of a driver intention to maintain the current vehicle operating parameters. When these conditions are satisfied, the controller 1 publishes an activation signal $S_{ACT}$ to a vehicle communications network to activate a vehicle glide mode. In dependence on the activation signal, the transmission 5 decouples the driveline 7 and a powertrain control module (PCM) 8 reduces the torque request, for example to zero. A reduction in fuel consumption by the engine 4 can be achieved.

In order to improve efficiency, the driveline 7 is decoupled as close as possible to the wheels W of the vehicle 2. The losses in the driveline 7 could be minimised by decoupling at the wheels W. However, this would require the provision of an additional clutch at each wheel W and is not practicable in the present embodiment. Rather, the driveline 7 in the present embodiment is decoupled within the transmission 5. In the present embodiment, the controller 1 is configured for operation with the 8HP automatic transmission 5 supplied by ZF Friedrichshafen AG, PO Box 650464, 66143 Saarbrücken, Germany. The transmission comprises eight (8) forward gears selectively controlled by two (2) brakes (referred to as the A and B brakes) and three (3) multi-disk clutches (referred to as C, D and E clutches). It will be appreciated that the controller 1 could be implemented with other transmissions.

Figure 2:
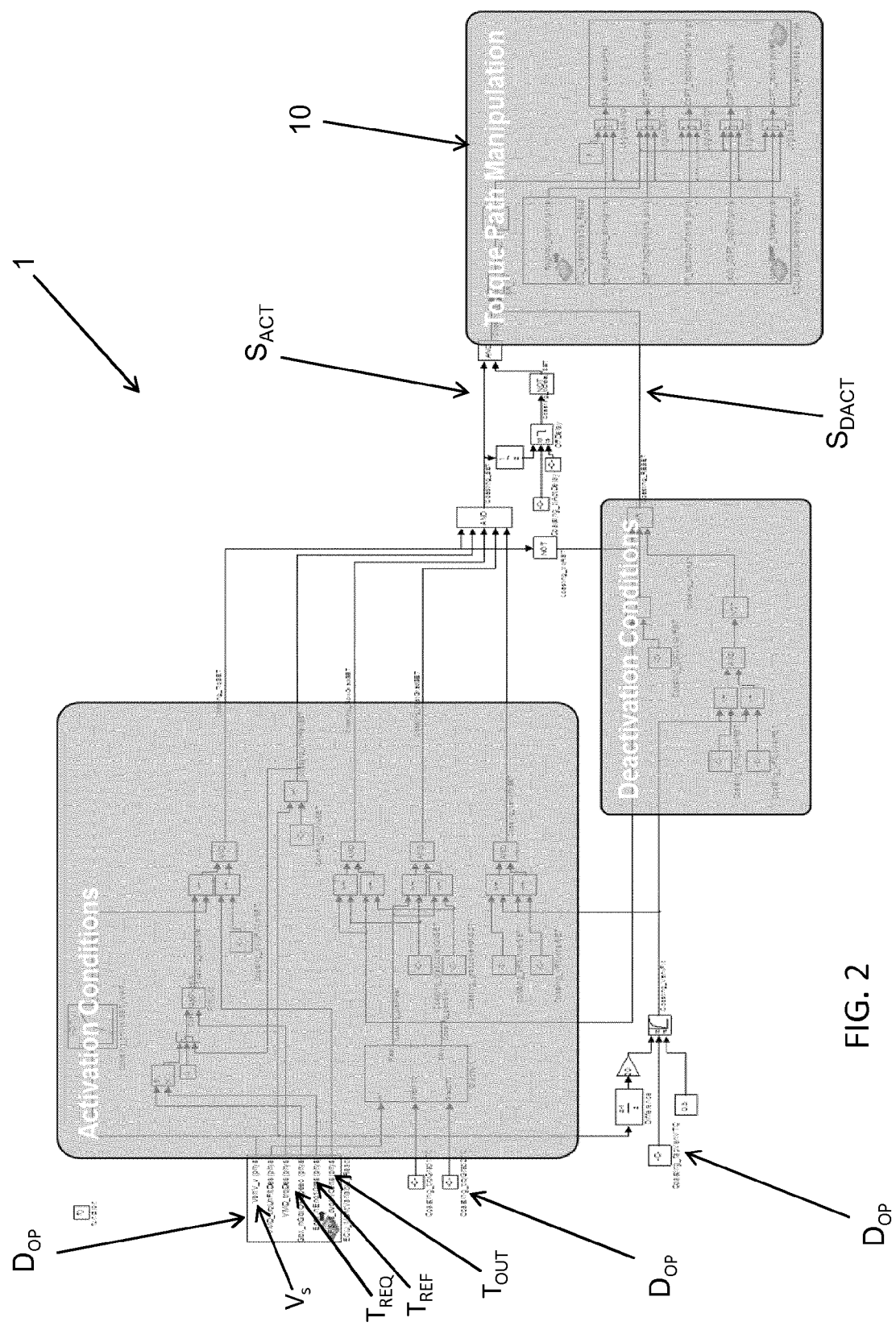
FIG. 2 shows a block diagram representing a vehicle controller for implementing a vehicle glide mode in accordance with an embodiment of the present invention.

With reference to the block diagram shown in FIG. 2, the controller 1 is configured to receive vehicle operating data $D_{OP}$ from one or more system sensors substantially in real-time. The vehicle operating data $D_{OP}$ comprises torque request data $T_{REQ}$ representative of a torque request made by the driver of the vehicle 2. The torque required to maintain running of the engine does not form part of the torque request defined herein. Rather, the torque request data $T_{REQ}$ is derived from a throttle pedal signal which is output from a throttle pedal sensor for measuring the position of the throttle pedal. Alternatively, the torque request data $T_{REQ}$ can be generated by a cruise control system, for example to match a target vehicle speed.

The transmission 5 is controlled by a transmission control module (TCM) 10 which detects the activation signal $S_{ACT}$ published to the communications network. In dependence on said activation signal $S_{ACT}$, the transmission control module 10 controls operation of the D clutch to decouple the transmission 5 from the driveline 7, as illustrated schematically in FIG. 1.

The vehicle controller 1 is configured to analyse the vehicle operating data $D_{OP}$ to identify vehicle glide opportunities (or windows) associated with one or more vehicle dynamic conditions. In the present embodiment, the controller 1 is configured to output the activation signal $S_{ACT}$ for activating the vehicle glide mode when the following vehicle operating conditions are satisfied:

(a) a (positive) non-zero torque request is detected;
(b) an output torque is below a predefined reference output torque; and
(c) vehicle acceleration is within a predefined range.

The positive non-zero torque request typically corresponds to the driver partially depressing a throttle pedal (not shown). It will, however, be understood that the torque request can be applied automatically to the vehicle engine, for example via a cruise control system (or an adaptive cruise control system) installed on the vehicle. A torque request range can be defined, for example comprising upper and lower torque request thresholds. The output torque should be below the predefined reference torque threshold, which typically corresponds to substantially steady-state operating conditions for the vehicle. The reference torque can be calibrated based on the current vehicle speed. The vehicle acceleration should be within a predefined range of a reference acceleration curve. The vehicle acceleration curve is defined for a given vehicle speed in the present embodiment.

Optionally, the controller 1 can perform an additional check to ensure that activating the vehicle glide mode will reduce fuel consumption by the engine 4, for example by performing a comparison between the current (instantaneous or average) fuel consumption and a stored reference fuel consumption for a torque request of zero. The output of the activation signal $S_{ACT}$ is inhibited if the transmission 5 is not in a suitable range, for example the activation signal $S_{ACT}$ can be inhibited if the transmission 5 is in $1^{st}$, $2^{nd}$ or $3^{rd}$ gears in the present embodiment. Also, the activation signal $S_{ACT}$ is inhibited if the measured fuel flow is less than a reference fuel flow. The controller 1 can be configured to inhibit activation of the vehicle glide mode if a stability event is detected. For example, the controller 1 can inhibit the vehicle glide mode if the vehicle steering angle is above a predefined steering threshold and/or the lateral acceleration of the vehicle 2 is above a lateral threshold.

The controller 1 receives output torque data indicating the output torque $T_{OUT}$; and accesses a first look-up table to determine a reference output torque $T_{REF}$ required to maintain the current vehicle speed on a horizontal road. The controller 1 compares the output torque $T_{OUT}$ and the reference output torque $T_{REF}$ to identify when the actual output torque $T_{OUT}$ is less than the reference output torque $T_{REF}$. When the controller 1 determines that the output torque $T_{OUT}$ is less than the reference output torque $T_{REF}$, a comparison is made between the actual vehicle acceleration (positive or negative) and a reference acceleration curve. The reference acceleration curve represents the acceleration expected for the vehicle 2 on a horizontal surface at the current vehicle speed. Upper and lower acceleration thresholds can be defined based on the reference acceleration curve to define an activation range. If the actual vehicle acceleration is within the activation range, and the torque request is within the defined torque request range, the controller 1 outputs said activation signal $S_{ACT}$ to activate the vehicle glide mode.

To facilitate the above comparison, the output torque $T_{OUT}$ and the reference torque $T_{REF}$ both relate to the torque output from the transmission 5. It will be appreciated that the torque at other locations in the powertrain 3 could be compared, for example the output torque from the engine 4 or the torque delivered to the wheels W.

Figure 3:
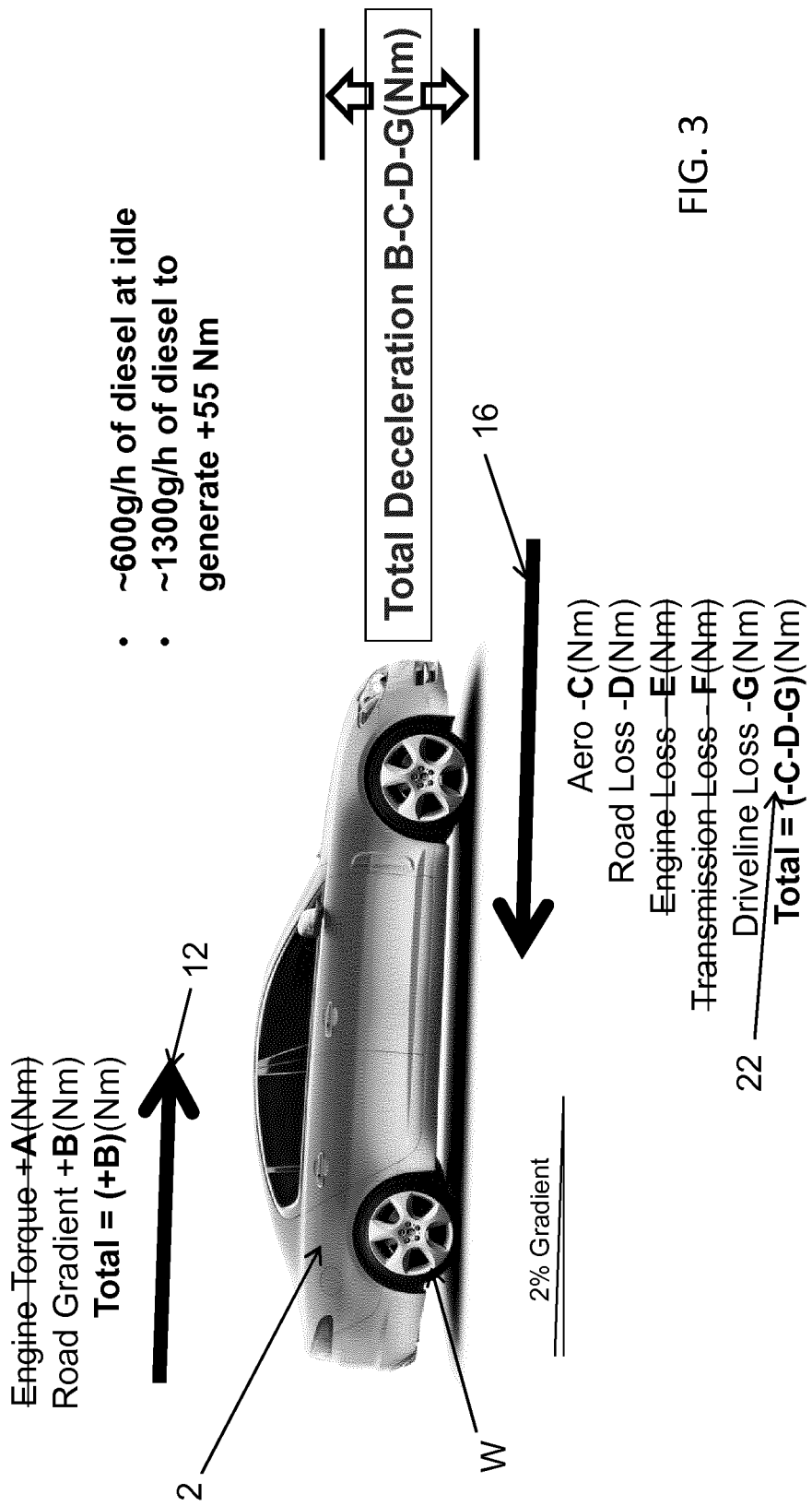
FIG. 3 illustrates the basic principles of the vehicle glide mode.

The basic operating principles of controller 1 will now be described by way of example with reference to FIG. 3. The vehicle 2 travels on a 2% negative gradient, as shown. In a first operational scenario in which the vehicle glide mode is not activated, the terms appearing in strikethrough characters in FIG. 3 are present. A first arrow 12 represents the sum of positive (i.e. accelerating) forces (expressed as the torque within the powertrain) acting on the vehicle 2: an engine torque A; and an effective torque B derived from the road gradient. The sum is a total torque at the wheels of A+B. A second arrow 16 represents the sum of negative (i.e. decelerating) forces (expressed as negative torque within the powertrain): an aerodynamic torque C; a road loss torque D; an engine loss torque E; a transmission loss torque F; and a driveline loss torque G. The total negative torque is −(C+D+E+F+G); and the total positive torque is (A+B). A first difference between the positive torque and the negative torque is calculated for the first operational scenario as follows: (A+B)−(C+D+E+F+G).

In a second operational scenario in which the vehicle glide mode has been activated, the driveline 7 is decoupled from the transmission 5. As a result, the terms appearing in strikethrough characters are cancelled. As shown in FIG. 3, the same deceleration rate is achievable by activating the vehicle glide mode in accordance with an aspect of the present invention. Specifically, the positive contribution of the engine torque A disappears together with the negative contributions of the engine loss torque E and transmission loss torque F. The total positive torque is (B), and the total negative torque is −(C+D+G). A second difference between the positive torque and the negative torque is calculated for the second operational scenario as follows: (B)−(C+D+G).

At least under certain operating conditions, the first and second differences can be substantially equal to each other. Thus, the vehicle acceleration curve is substantially unchanged when the vehicle glide mode is activated. The net effect of activating the vehicle glide mode in this example is therefore that of eliminating engine torque A when not needed. At least in certain embodiments, this can be implemented without causing a perceptible change in the vehicle acceleration. The controller 1 can be configured to activate the vehicle glide mode when the difference between said first and second differences is within a predefined range.

Figure 4:
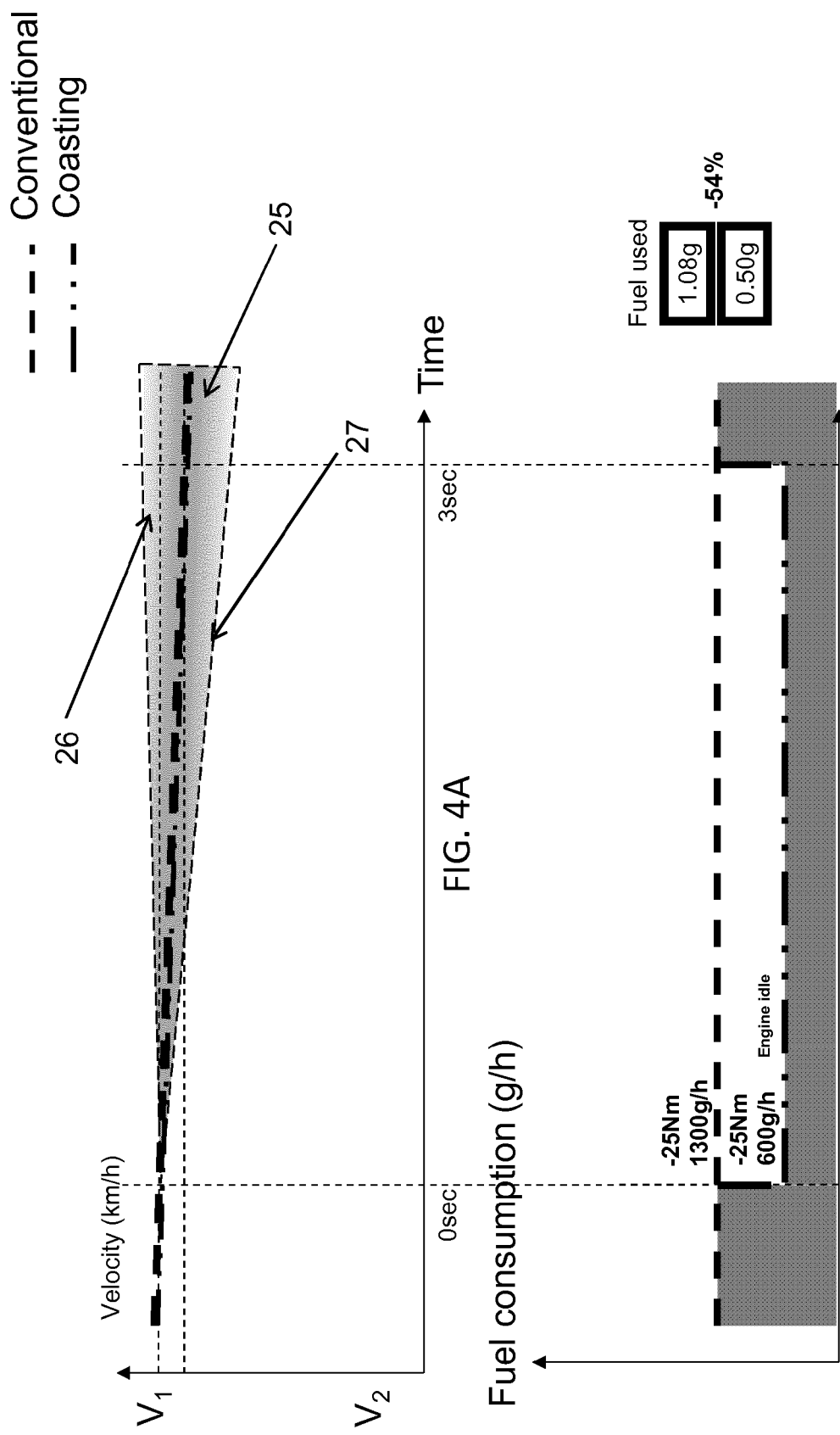
FIGS. 4A-B show comparative graphs of velocity and fuel consumption versus time relating to the example shown in FIG. 3.

FIGS. 4A and 4B illustrate the above concept. FIG. 4A is a speed versus time diagram for the vehicle 2. The graphs are plotted both for a conventional (i.e. non-vehicle glide) mode and the vehicle glide mode exemplified by FIG. 3. The shaded region in FIG. 4A represents schematically a velocity variation perception region 25. The speed variation perception region 25 relates to a typical driver. The upper and lower boundaries of said region represent speed variation perception thresholds 26, 27. If the vehicle speed drops during the vehicle glide mode below the limits defined by the thresholds 26, 27, the driver will be likely to perceive a difference in driving experience between the conventional and the vehicle glide modes. As shown by FIG. 4A, the example of FIG. 3 corresponds substantially to equivalent vehicle behaviours under conventional or vehicle glide modes. As a consequence, in the example shown in FIG. 3, the driver is unlikely to perceive any difference in driving experience. However, in the vehicle glide mode fuel savings of approximately 54% can be achieved for the three (3) second operating window during which the vehicle glide mode is active, as shown by FIG. 4B. It will be understood that the example described in connection with FIGS. 3, 4A and 4B is a theoretical case, and is described herein only to help the reader understand the invention.

Figure 5:
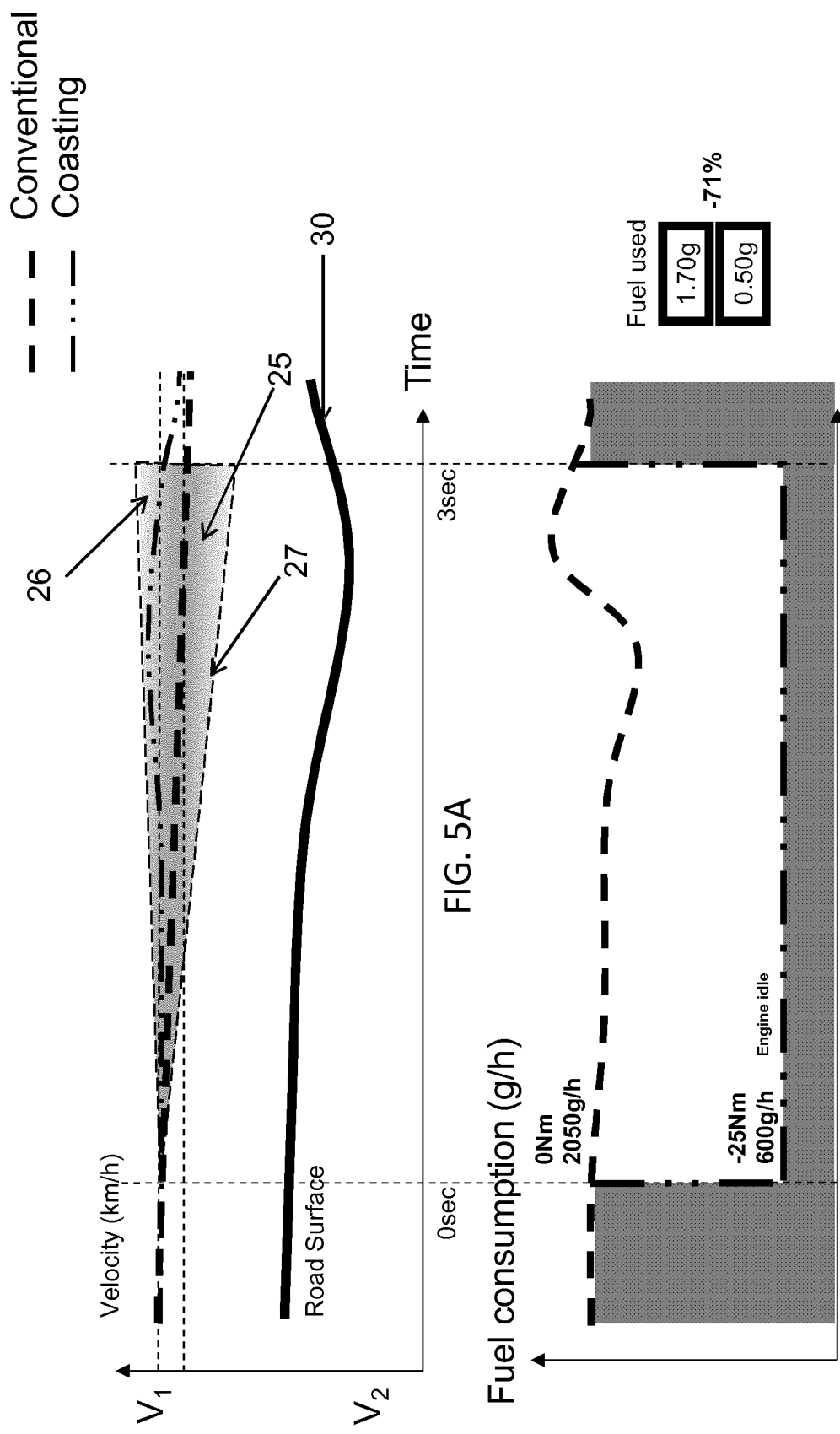
FIGS. 5A-B show comparative graphs of velocity and fuel consumption versus time, for a given road surface pattern, between a conventional travel mode and a vehicle glide mode activated by a controller according to an embodiment of the present invention.

The present invention recognises that the negative gradient of the road contributes a positive effective torque to the vehicle 2. In the example of FIGS. 3, 4A, and 4B the road gradient is constant. FIG. 5A shows instead a similar velocity versus time graph along a changing road gradient 30. Initially, the road gradient 30 is negative (i.e. the road slopes downwardly in the direction of travel of the vehicle 2) and substantially constant. The negative gradient of the road gradient 30 then increases, before becoming positive (i.e. the road slopes upwardly in the direction of travel of the vehicle 2). The vehicle glide mode is activated at an initial time (denoted 0 seconds in FIG. 5A) and the vehicle 2 accelerates in response to the negative road gradient 30 and decelerates in response to the positive road gradient 30. The vehicle glide mode remains active until an exit condition is determined. The fuel saved is about 71% over the 3 second window in which the vehicle glide mode is active, as shown in FIG. 5B. The activation/deactivation of the vehicle glide mode is controlled to maintain changes in the vehicle speed within a range which cannot readily be perceived by the driver.

Figure 6:
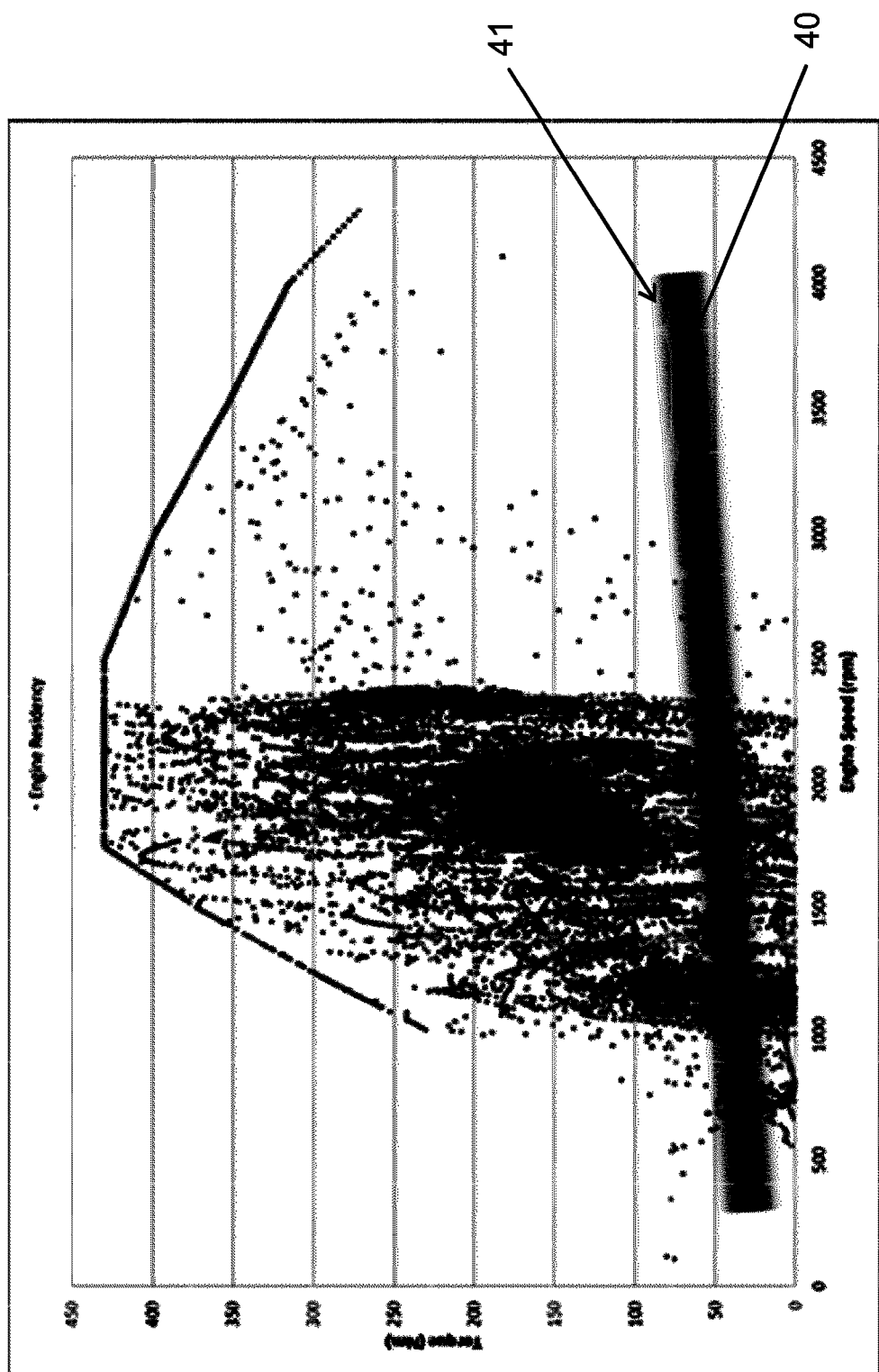
FIG. 6 is an engine residency graph of an output torque versus engine speed showing a proposed variable threshold for vehicle glide activation.

This operation of the controller 1 will be explained with reference to the output torque from the transmission 5 (when operating in a single gear) and the vehicle engine speed. With reference to FIG. 6, the dots each represent an engine residency regime, i.e. each dot represents a working condition of the engine wherein the engine delivers a torque (measured at the output of the transmission 5) at a certain vehicle engine speed. The exact point of engine residency is determined by the balance between the torque requested by the driver (driver side) and the torque demanded by the road (vehicle side). As can be seen from FIG. 6, the engine idling speed in the present case is at about 650 rpm. The torque developed by the engine 4 at idling is generally below 50 Nm, which serves to maintain the engine in motion and to run various engine ancillaries. Under most conditions, the engine 4 will operate at speeds between approximately 1000 rpm and approximately 2250 rpm, and torque up to full load (around 450 Nm in the illustrated scenario). It will be appreciated that the engine operating range, both engine speed and output torque, can vary for different engines 4. A shaded band 40 shown in FIG. 6 represents a region of vehicle glide opportunities. The band 40 is defined, in this example, on the basis of the transmission output torque and the engine speed. If the engine residency falls inside the shaded region 40, then the output torque and engine speed are considered favourable for activating the vehicle glide mode, provided the other operating conditions described herein are satisfied. The region 40 defines an upper boundary 41 which represents a threshold for deactivation of the vehicle glide mode. If the transmission output torque and engine speed are favourable for activation of the vehicle glide mode, the controller 1 is configured to generate the activation signal $S_{ACT}$. The controller 1, however, is configured to analyse additional parameters to determine whether it is advantageous to activate the vehicle glide mode.

The controller 1 is configured to combine the output torque $T_{OUT}$ (measured at the transmission output) and vehicle acceleration (positive and/or negative), to determine the effective torque delivered by the road gradient. A reference vehicle acceleration curve is defined which reflects the rate of acceleration that is expected on a horizontal surface for a given output torque. A range is determined by imposing upper and lower thresholds based on this acceleration curve to represent an acceleration range in which the vehicle gliding mode can be activated. The controller 1 also monitors the current torque request. If the acceleration of the vehicle 2 is within the determined range and the torque request is positive and non-zero, then the controller 1 is configured to activate the vehicle gliding mode. If vehicle acceleration is too high for a given output torque, this could indicate that the (negative) road gradient 30 is too large, and the controller can inhibit activation of the vehicle glide mode. It will be apparent that the range can be calibrated to adjust activation of the vehicle glide mode.

The controller 1 is also configured to receive vehicle speed data representative of vehicle speed $V_S$. It is important that the vehicle inertia (a function of speed $V_S$) be sufficient to mask any transitions as the vehicle glide mode is activated/deactivated. Specifically, activating/deactivating the vehicle glide mode at low vehicle speeds can create driveline shunts as the available vehicle inertia is insufficient to mask the engagement and disengagements of the D clutch in the transmission 5. This would result in an unacceptable driving experience. The controller 1 is configured to inhibit output of the activation signal $S_{ACT}$ if the vehicle speed $V_S$ is below a predefined threshold.

The controller 1 is also configured to receive gear data representative of a gear number engaged by the transmission 5. In the present embodiment, the vehicle glide mode is activated only when the transmission 5 is in fourth gear or higher. However, this does not represent a limitation in the applicability of the present invention rather it is due to technical limitations relating to the transmission 5 in the present embodiment. The controller 1 is configured to inhibit output of the activation signal $S_{ACT}$ if the transmission 5 is not in a predefined operating range.

The controller 1 is also configured to receive fuel consumption data representative of fuel consumption. The parameter monitored in this example for this purpose is instantaneous fuel flow. If fuel flow is less than a reference idle fuel flow, the controller 1 is configured to inhibit output of the activation signal $S_{ACT}$. This strategy is used to avoid activating the vehicle glide mode when it is determined that it would be more efficient to continue in the current operating mode.

As outlined above, the controller 1 is configured to inhibit activation of the vehicle glide mode if a vehicle stability event is detected. The controller 1 is also configured to receive steering angle data representative of a steering angle of the vehicle 2. The controller 1 inhibits activation of the vehicle glide mode if a high rate of steering angle is detected (rate of change). This strategy is intended to guard against unexpected changes in vehicle control which might occur if the vehicle gliding mode is activated during certain vehicle manoeuvres.

The controller 1 described herein is also configured selectively to generate a deactivating signal $S_{DACT}$ for deactivating the vehicle glide mode when a vehicle glide exit condition is detected, as illustrated in FIG. 2. For the purpose of identifying vehicle glide exit conditions, the controller 1 determine certain parameters based on the vehicle operating data $D_{OP}$. The parameters are then assessed to identify appropriate vehicle glide exit conditions.

The controller 1 determines whether the output torque request plus an offset is greater than a predetermined exit threshold. This exit threshold is used to detect when the driver wants to reapply torque to the drivetrain. The offset is set with reference to the amount of torque required to maintain a constant speed on a flat surface, i.e. with reference to the reference torque $T_{REf}$.

The controller 1 determines whether the vehicle acceleration has not significantly increased or decreased since entry into the vehicle glide mode. If the vehicle glide mode has been activated and the road gradient changes (for example the negative gradient increases) it is possible for the vehicle to accelerate excessively. The controller 1 can implement an exit strategy by outputting the deactivation signal $S_{DACT}$ if the vehicle acceleration deviates significantly from the entry acceleration (i.e. the vehicle acceleration when the vehicle glide mode was activated); or exceeds a defined acceleration threshold.

In the described embodiment, the controller 1 is part of an engine management control module 100. This is represented in FIGS. 7 and 8 which show flow diagrams representing respectively vehicle glide activation and deactivation (exit) strategies implemented by vehicle system 51 which comprises the engine management control module 100.

Figure 7:
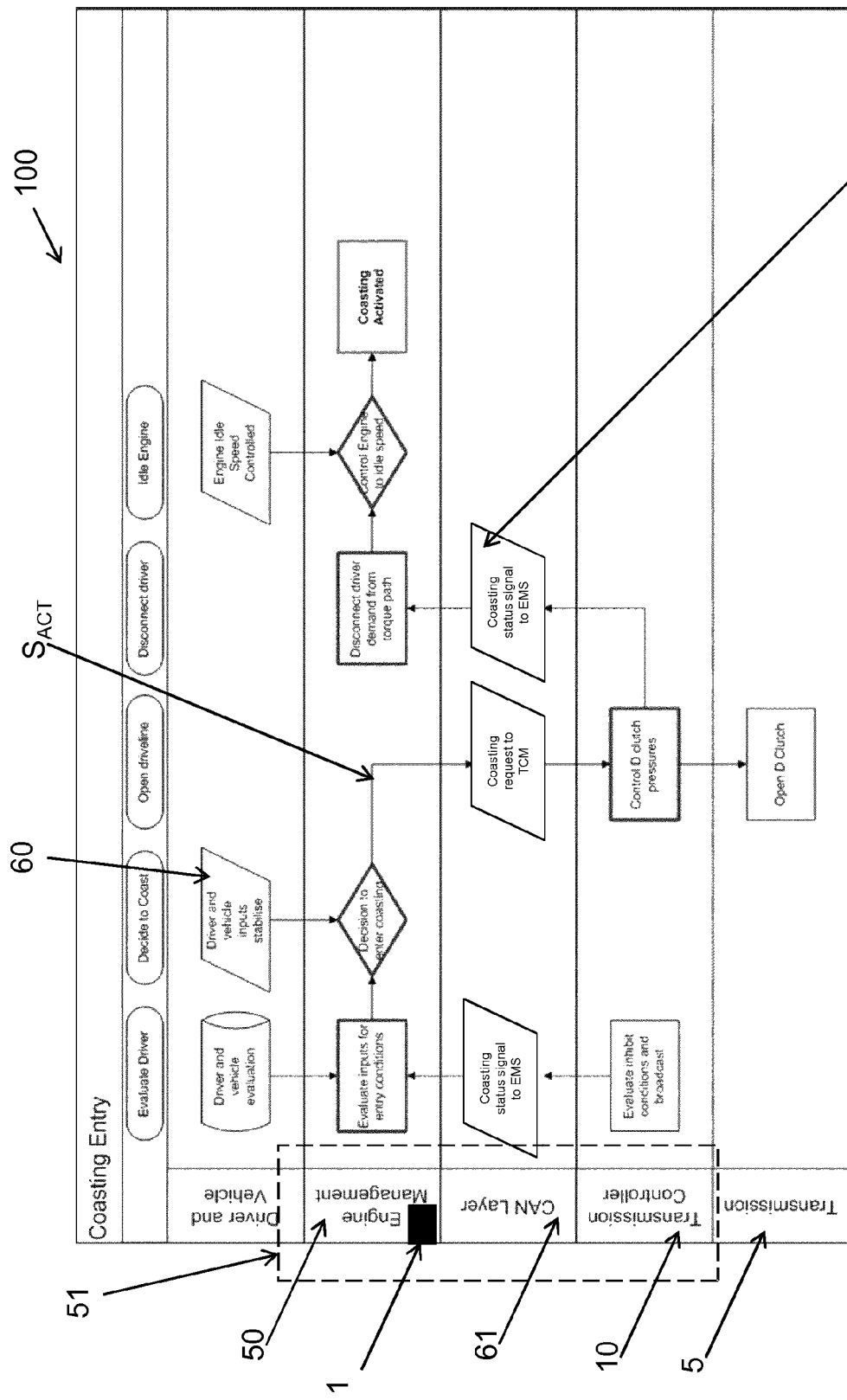
FIG. 7 is flow chart representing a vehicle glide activation strategy implemented by a vehicle system in accordance with an embodiment of the present invention.
Figure 8:
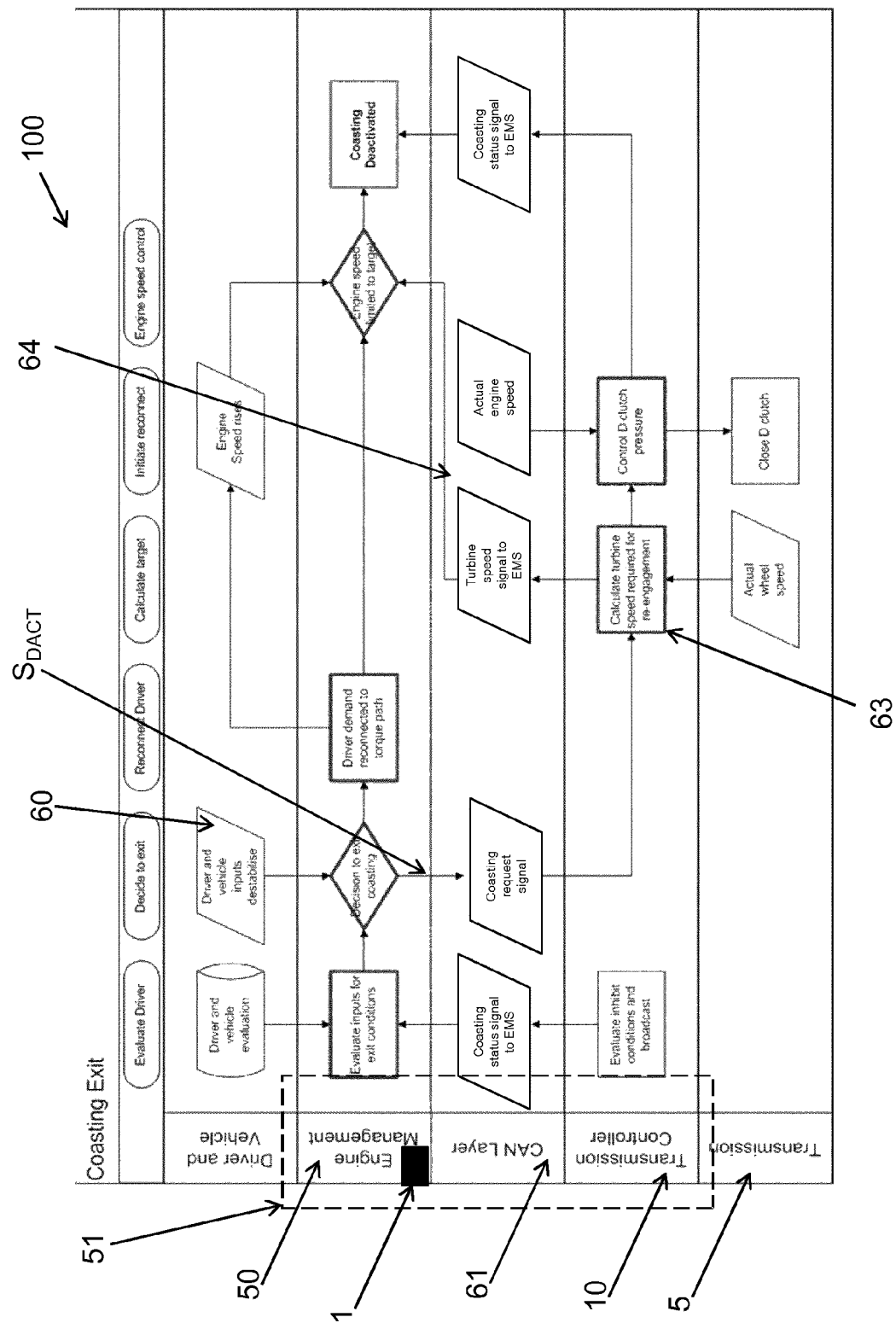
FIG. 8 is a flow chart representing a vehicle glide deactivation (or exit) strategy implemented by a vehicle system in accordance with an embodiment of the present invention.

The controller 1 continuously receives the vehicle operating data $D_{OP}$, which in FIGS. 7 and 8 are in the form of input entry conditions 60. As shown in FIG. 7, the controller 1 evaluates said input entry conditions 60 in order to take a decision to activate a vehicle glide mode. When a vehicle glide opportunity is identified, the controller 1 generates the activation signal $S_{ACT}$ to activate the vehicle glide mode. The activation signal $S_{ACT}$ is passed to the TCM 10 via a controller area network (CAN) 61. The TCM 10 opens the D clutch to decouple the powertrain 8. A gliding status signal 62 is generated by the TCM 10 and returned to the engine management control module 100. At this point, the engine management control module 100 controls the D clutch to disconnect the drivetrain 7 and control the engine speed.

As shown in FIG. 8, the controller 1 also continuously evaluates the input entry conditions 60 until an exit condition for exiting the vehicle glide mode is determined. When the exit condition is met, the controller 1 determines that the vehicle 2 should exit the vehicle glide mode and the deactivation signal $S_{DACT}$ is generated. The TCM 10 calculates the engine speed for reengagement 63, closes the D clutch and sends a speed change signal 64 to the engine control module 100 so that the engine control module 100 can raise the engine speed until it matches the engine speed for reengagement. The vehicle glide mode is thereby deactivated.

When the torque request is greater than zero and the vehicle road load is substantially compensated for by external factors, such as a negative road gradient, the controller 1 identified a vehicle gliding opportunity and outputs an activation signal $S_{ACT}$. In dependence on the activation signal $S_{ACT}$, the transmission control module opens the D clutch in the transmission 5 to decouple the powertrain 3. In dependence on the activation signal $S_{ACT}$, the engine control module reduces the engine speed, typically to an engine idle speed, to maintain oil pressure in the transmission 5 and to run engine mounted ancillaries etc.

As will be understood by the skilled person, appropriate tolerances and time delays can be applied in this process, for example to prevent a previously identified vehicle glide opportunity being prematurely cancelled by the controller 1 if a newly identified transient vehicle dynamic condition is identified which is incompatible with the defined vehicle glide mode changes. In the present embodiment, a time delay of 10 seconds is applied, which means that if a new vehicle dynamic condition incompatible with the vehicle glide mode is determined, no vehicle glide deactivation action is taken by the controller 1 unless the new vehicle dynamic condition lasts longer than 10 seconds.

At least in certain embodiments, the activation of the vehicle glide mode may improve fuel efficiency while maintaining a satisfactory driver experience. If suitable vehicle dynamic conditions are identified, the vehicle glide mode is implemented by the controller 1 when there is a positive torque request. At least in certain embodiments, the driver is unlikely to perceive any difference in driving characteristics when the vehicle glide mode is activated.

It will be apparent to the skilled person that many variations of the invention are possible, within the scope of the appended claims.

Further aspects of the present invention are set out in the following numbered paragraphs:

1. A vehicle controller for activating a vehicle glide mode, the controller being configured to receive vehicle operating data, said vehicle operating data comprising:
   torque request data representative of a torque request;
   acceleration data representative of vehicle acceleration; and
   output torque data representative of an output torque;
   wherein the controller is configured to analyse said vehicle operating data to identify a vehicle glide opportunity; wherein the controller is configured to generate an activation signal for activating the vehicle glide mode when said vehicle glide opportunity has been identified and the torque request is positive.

2. A controller as described in paragraph 1, wherein said controller is configured to compare the output torque to a reference torque and to identify a vehicle glide opportunity when the output torque is less than the reference torque.

3. A controller as described in paragraph 2, wherein the reference torque is representative of the output torque required to maintain a substantially constant vehicle speed on a horizontal surface.

4. A controller as described in paragraph 1, wherein the controller is configured to identify said vehicle glide opportunity when the vehicle acceleration substantially matches a defined acceleration curve; or the vehicle acceleration is between an upper acceleration threshold and/or a lower acceleration threshold, the upper acceleration threshold and/or the lower acceleration threshold being based on a defined acceleration curve.

5. A controller as described in paragraph 4, wherein said defined acceleration curve is based on vehicle speed.

6. A controller as described in paragraph 5, wherein the controller is configured to identify said vehicle glide opportunity when the torque request is substantially uniform and/or with defined torque request tolerances.

7. A controller as described in paragraph 1, wherein the controller is configured to output an engine control signal for reducing the engine speed when the vehicle glide mode is activated.

8. A controller as described in paragraph 1, wherein the controller is configured to output a driveline control signal to decouple at least a portion of the vehicle driveline when the vehicle glide mode is activated.

9. A controller as described in paragraph 1, wherein said vehicle operating data comprise one or more of the following data:
   vehicle speed data representative of vehicle speed;
   vehicle steering angle data representative of vehicle steering angle;
   vehicle gear position data representative of vehicle gear position;
   engine speed data representative of engine speed; and transmission output speed data representative of transmission output speed.

10. A controller as described in paragraph 9, wherein the controller is configured to identify a vehicle glide opportunity when one or more of the following conditions are satisfied:
the vehicle speed is greater than a reference vehicle speed; and
the gear position is greater than a reference gear position.

11. A controller as described in paragraph 1, wherein said vehicle operating data further comprise fuel flow data representative of vehicle fuel consumption; the controller being configured to inhibit said activation signal when the vehicle fuel consumption is less than a reference vehicle fuel consumption, the reference vehicle fuel consumption optionally being the vehicle fuel consumption when the engine is idling.

12. A controller as described in paragraph 1, wherein the controller is configured to generate a deactivation signal for deactivating the vehicle glide mode.

13. A controller as described in paragraph 12, wherein the controller is configured to determine a target engine speed for deactivating the vehicle gliding mode.

14. A controller as described in paragraph 12, wherein the controller is configured to generate the deactivation signal when one or more of the following conditions are satisfied:
the torque request is greater than a reference torque request threshold;
the output torque is greater than an output torque threshold; and
the vehicle acceleration is greater than a reference vehicle acceleration.

15. A controller as described in paragraph 1, wherein said vehicle operating data further comprise throttle pedal data representative of a deflection of a throttle pedal.

16. A controller as described in paragraph 15, wherein the controller is configured to determine that said torque request is greater than zero when the throttle pedal is deflected past a neutral pedal position.

17. A controller as described in paragraph 15, wherein the controller is configured to identify a vehicle glide opportunity when the deflection of the throttle pedal is constant or decreasing at a predefined rate.

18. A controller as described in paragraph 15, wherein the controller is configured to identify a vehicle glide opportunity when the deflection of the throttle pedal is within a throttle pedal deflection range delimited by a lower pedal deflection threshold and an upper throttle pedal deflection.

19. A controller as described in paragraph 18, wherein the controller is configured to generate a deactivation signal for deactivating the vehicle glide mode when the deflection of the throttle pedal is below the lower throttle pedal deflection or above the upper throttle pedal deflection.

20. A controller as described in paragraph 1, wherein the controller is configured to send said activation signal for activating the vehicle glide mode to a transmission control module to decouple at least a portion of the driveline.

21. A controller as described in paragraph 1, wherein the controller is configured to receive said torque request data from a vehicle cruise control module.

22. An engine control module comprising a controller as described in paragraph 1.

23. A vehicle system comprising an engine control module as described in paragraph 22; or a controller as described in paragraph 1.

24. A vehicle comprising a vehicle system as described in paragraph 23.

25. A method of activating a vehicle glide mode, the method comprising:
receiving vehicle operating data comprising:
torque request data representative of a torque request;
acceleration data representative of vehicle acceleration; and
output torque data representative of an output torque;
analysing said vehicle operating data to identify a vehicle glide opportunity; and
generating an activation signal for activating the vehicle glide mode when said vehicle glide opportunity has been identified and the torque request is greater than zero.

26. A computer program product for configuring or reconfiguring a vehicle system having a controller, the computer program product comprising a computer readable storage medium including computer readable program code, wherein the computer readable program code, when executed on the vehicle system, configures or reconfigures the vehicle system for performing a method as described in paragraph 25.

The invention claimed is:

1. A vehicle controller for activating a vehicle glide mode, the controller being configured to receive vehicle operating data, said vehicle operating data comprising:
torque request data representative of a torque request;
acceleration data representative of vehicle acceleration; and
output torque data representative of an output torque;
wherein the controller is configured to analyze said vehicle operating data to identify a vehicle glide opportunity; wherein the controller is configured to generate an activation signal for activating the vehicle glide mode when said vehicle glide opportunity has been identified and the torque request is positive.

2. A controller according to claim 1, wherein the controller is configured to generate a deactivation signal for deactivating the vehicle glide mode, wherein once said activation signal has been generated the controller is configured to maintain activation of said glide mode until said deactivation signal is generated.

3. A controller according to claim 2, wherein the controller is configured to determine a target engine speed for deactivating the vehicle gliding mode.

4. A controller according to claim 2, wherein the controller is configured to generate the deactivation signal when one or more of the following conditions are satisfied:
the torque request is greater than a reference torque request threshold;
the output torque is greater than an output torque threshold; and
the vehicle acceleration is greater than a reference vehicle acceleration.

5. A controller according to claim 1, wherein said controller is configured to compare the output torque to a reference torque and to identify a vehicle glide opportunity when the output torque is less than the reference torque.

6. A controller according to claim 5, wherein the reference torque is representative of the output torque required to maintain a substantially constant vehicle speed on a horizontal surface.

7. A controller according to claim 1, wherein the controller is configured to identify said vehicle glide opportunity when the vehicle acceleration substantially matches a defined acceleration curve; or the vehicle acceleration is between an upper acceleration threshold and a lower acceleration threshold, at least one of the upper acceleration threshold and the lower acceleration threshold being based on a defined acceleration curve.

8. A controller according to claim 1, wherein the controller is configured to identify said vehicle glide opportunity when the torque request is at least one of substantially uniform and within a defined torque request range.

9. A controller according to claim 1, wherein the controller is configured, when the vehicle glide mode is activated, to output at least one of an engine control signal for reducing the engine speed and a driveline control signal to decouple at least a portion of the vehicle driveline.

10. A controller according to claim 1, wherein said vehicle operating data comprise at least one of the following data:
vehicle speed data representative of vehicle speed;
vehicle steering angle data representative of vehicle steering angle;
vehicle gear position data representative of vehicle gear position;
engine speed data representative of engine speed; and
transmission output speed data representative of transmission output speed.

11. A controller according to claim 10, wherein the controller is configured to identify a vehicle glide opportunity when at least one of the following conditions are satisfied:
the vehicle speed is greater than a reference vehicle speed; and
the gear position is greater than a reference gear position.

12. A controller according to claim 1, wherein
said vehicle operating data comprises fuel flow data representative of vehicle fuel consumption;
the controller is configured to inhibit said activation signal when the vehicle fuel consumption is less than a reference vehicle fuel consumption.

13. A controller according to claim 12, wherein the reference vehicle fuel consumption is the vehicle fuel consumption when the engine is idling.

14. A controller according to claim 1, wherein
said vehicle operating data comprises throttle pedal data representative of a deflection of a throttle pedal; and
the controller is configured to determine that said torque request is greater than zero when the throttle pedal is deflected past a neutral pedal position.

15. A controller according to claim 14, wherein the controller is configured to identify a vehicle glide opportunity when the deflection of the throttle pedal is constant or decreasing at a predefined rate.

16. A controller according to claim 14, wherein the controller is configured to identify a vehicle glide opportunity when the deflection of the throttle pedal is within a throttle pedal deflection range delimited by a lower pedal deflection threshold and an upper throttle pedal deflection threshold.

17. A controller according to claim 16, wherein the controller is configured to generate a deactivation signal for deactivating the vehicle glide mode when the deflection of the throttle pedal is below the lower throttle pedal deflection threshold or above the upper throttle pedal deflection threshold.

18. An engine control module comprising a controller according to claim 1.

19. A vehicle system comprising a controller according to claim 1.

20. A vehicle comprising a vehicle system according to claim 19.

21. A method of activating a vehicle glide mode, the method comprising:
receiving vehicle operating data comprising:
torque request data representative of a torque request;
acceleration data representative of vehicle acceleration; and
output torque data representative of an output torque;
analyzing said vehicle operating data to identify a vehicle glide opportunity; and
generating an activation signal for activating the vehicle glide mode when said vehicle glide opportunity has been identified and the torque request is greater than zero.

22. A computer program product for configuring or reconfiguring a vehicle system having a controller, the computer program product comprising a non-transitory computer readable storage medium including computer readable program code, wherein the computer readable program code, when executed, configures or reconfigures the vehicle system for executing the following:
receiving vehicle operating data comprising:
torque request data representative of a torque request;
acceleration data representative of vehicle acceleration; and
output torque data representative of an output torque;
analyzing said vehicle operating data to identify a vehicle glide opportunity; and
generating an activation signal for activating the vehicle glide mode when said vehicle glide opportunity has been identified and the torque request is greater than zero.

* * * * *